Oct. 17, 1933.   R. B. OTWELL   1,931,392
UNITARY PLUMBING EQUIPMENT FOR BATHROOMS
Filed April 22, 1932   4 Sheets-Sheet 1

Inventor
Ralph B. Otwell
By S. E. Thomas
Attorney

Oct. 17, 1933.  R. B. OTWELL  1,931,392

UNITARY PLUMBING EQUIPMENT FOR BATHROOMS

Filed April 22, 1932  4 Sheets-Sheet 2

Inventor
Ralph B. Otwell
By S. E. Thomas
Attorney

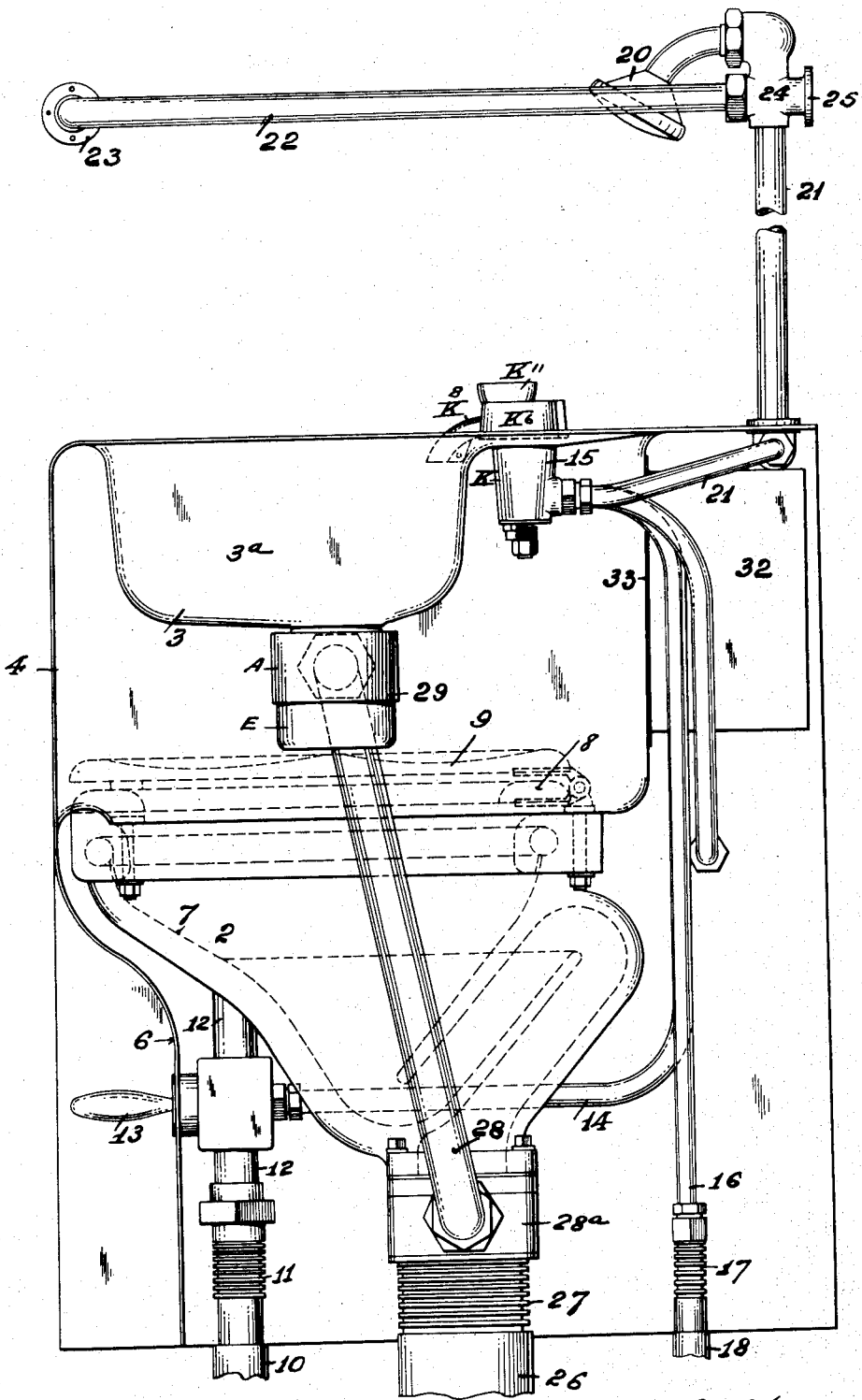

Oct. 17, 1933.  R. B. OTWELL  1,931,392
UNITARY PLUMBING EQUIPMENT FOR BATHROOMS
Filed April 22, 1932  4 Sheets-Sheet 4
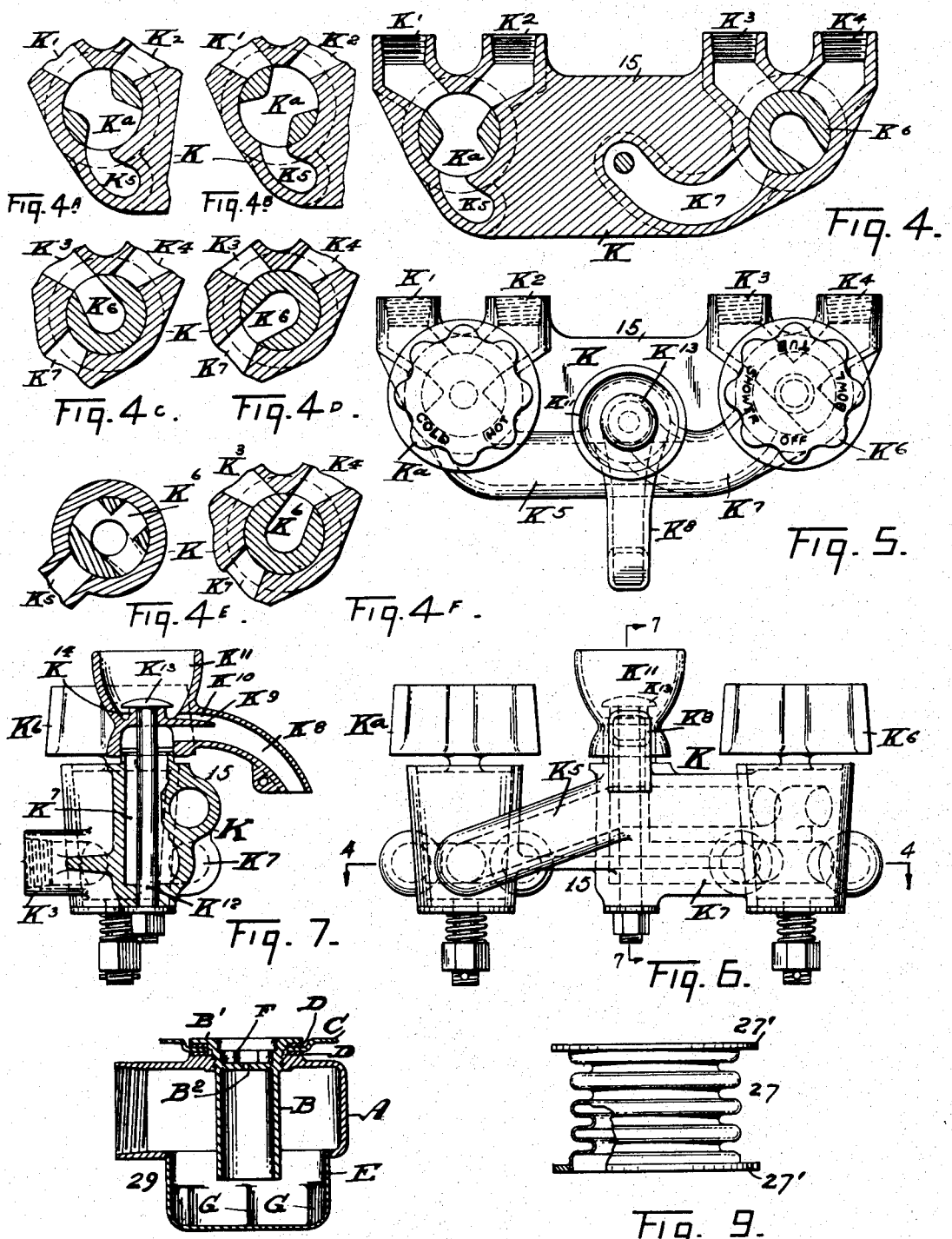

Patented Oct. 17, 1933

1,931,392

UNITED STATES PATENT OFFICE 1,931,392

UNITARY PLUMBING EQUIPMENT FOR BATHROOMS

Ralph B. Otwell, Detroit, Mich.

Application April 22, 1932. Serial No. 606,886

3 Claims. (Cl. 4—3)

My invention relates to a structure comprising a bath tub, lavatory, and toilet forming a single unit ready for installation either in a bathroom or bedroom.

The primary object of this invention is to provide a unitary structure of such character that the plumber or other person employed to install the device has only to connect three pipes with the corresponding service pipes of the building,— whereupon the several elements comprising the structure are respectively ready for use.

It is well known that it requires much time, labor and expense for skilled workmen to install the several fixtures of a bathroom that the elements may function properly.

It is therefore the purpose of this invention to have the usual bathroom fixtures connected to correlate as a unitary structure, that they may be quickly installed for immediate use and by relatively unskilled workmen.

The usual bathrooms in apartment houses and buildings of moderate size being substantially standard in dimensional character, the service pipes leading thereto may be installed in new buildings with a view for immediate connection with the pipes of the unitary structure and in any event a connection may be easily made between the outlets of the unitary structure and the service pipes of any building.

Another feature of the invention consists in providing means for a slight adjustment of the pipe connections of the structure, whereby they may be adapted for registration with the openings of the service pipes of the building, even though the latter installation may vary from the several spaced pipe connections of the fixture.

Another feature of the invention is to provide a temperature, or hot and cold water mixing and selector valve, the flow of water being controlled so that either cold or hot water,—or water of any desired temperature may be delivered through the discharge outlets opening into the lavatory, bath tub,—or shower, as required.

Another feature of the invention consists in providing means whereby the cold water when turned on may be delivered into the bowl of the lavatory, or directed into a fountain drinking cup as desired.

Another feature of the invention consists in the traps to receive the discharge from the lavatory and tub, the construction being such that it may be readily removed for cleaning or repairs without disturbing the other fittings or fixtures, and without the necessity of calling in a skilled mechanic to remove it.

Another feature of the invention is the cover for the toilet which is constructed as a saddle-seat facing the tub that the tub may be used for a foot bath when required.

A further object of the invention is to provide for the ready connection of the hot and cold water pipes and also the discharge pipes of the unitary structure with the service piping of the building. In carrying this into effect, corrugated metal pipe connections connect the fittings of the unitary structure with the corresponding pipe connections of the building. It will be obvious however that the flexibility of the corrugated pipe serves a dual purpose.

First it provides for any slight lateral variation that may occur in the spacing of the pipe connections of the unitary device with the corresponding piping of the building, and secondly it relieves the usual pounding occasioned by suddenly turning off of the water delivered through the piping in which the corrugated pipe connection is employed.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 3 is an end elevation of the same.

Figure 4 is a horizontal sectional view, taken on or about line 4—4 of Figure 6, of the temperature and selector valve, controlling the admission of hot and cold water to the lavatory, tub and shower, and whereby the temperature of the water may be regulated before it is discharged from the several outlets.

Figure 4A is a fragmentary sectional view of the valve shown in Figure 4, indicating the valve turned for the passage of only cold water.

Figure 4B shows the valve turned for the passage of only hot water.

Figure 4C shows the valve turned to admit water to the tub.

Figure 4D shows the valve turned to admit water to the bowl.

Figure 4E shows the valve positioned to cut off the water to all fixtures.

Figure 4F shows the valve turned to admit water to the shower.

Figure 5 is a plan view of the combined temperature and selector valves.

Figure 6 is a side elevation of same.

Figure 7 is a cross-sectional view taken through the drinking cup, or on or about line 7—7 of Figure 6.

Figure 8 is a cross-sectional view through the trap.

Figure 9 is a fragmentary elevation of a detail, with a portion broken away and in section, showing the flexible pipe or nipple for connecting the pipes of the unitary structure with the service pipes of the building.

Figure 1:
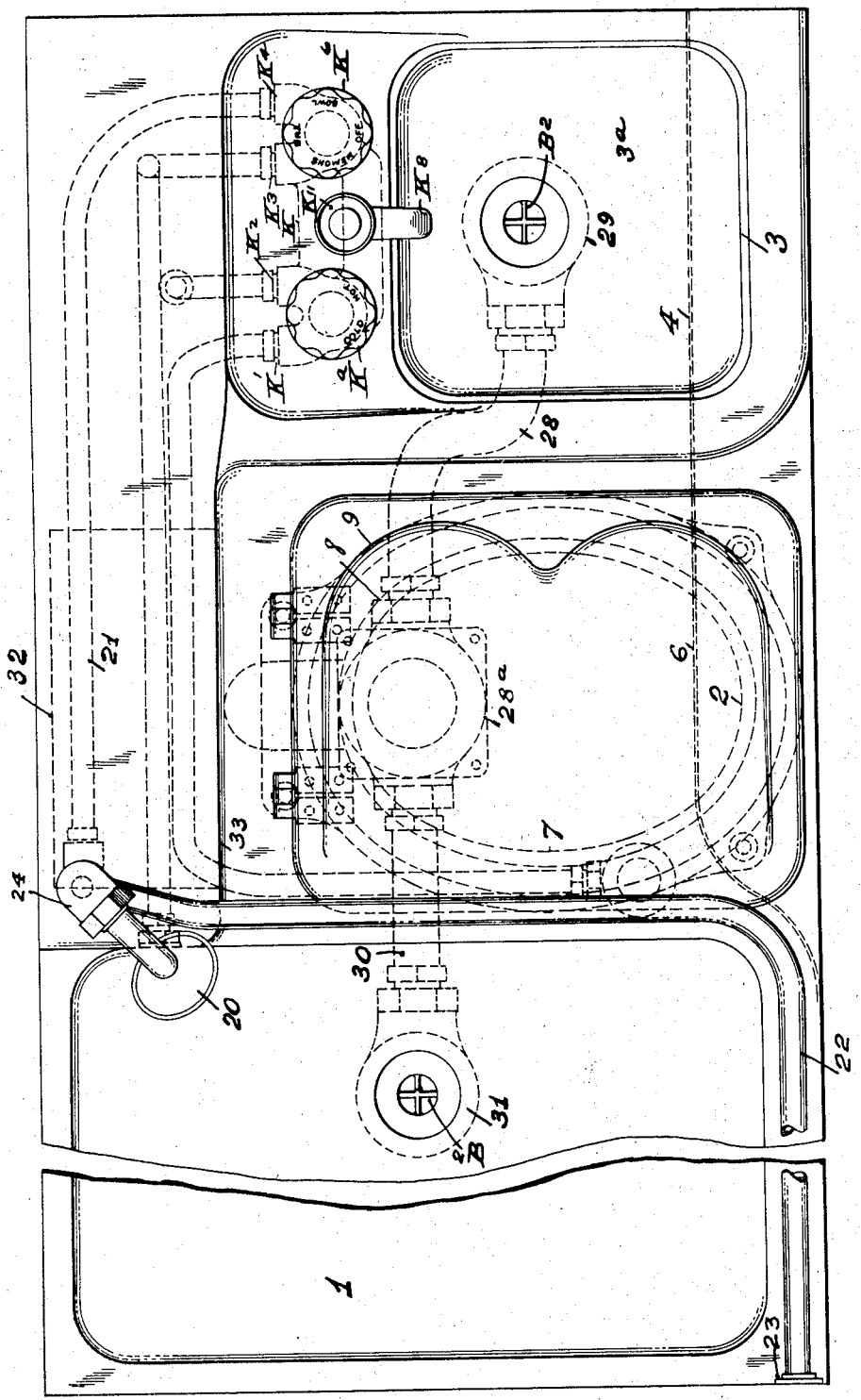
Figure 1 is a plan view of a unitary structure comprising a bath tub—used also for a foot bath and shower—a portion of the tub being broken away to accommodate the view to the size of the sheet,—also a toilet and lavatory, with suitable pipe connections leading to the several parts, and valves controlling same.
Figure 2:
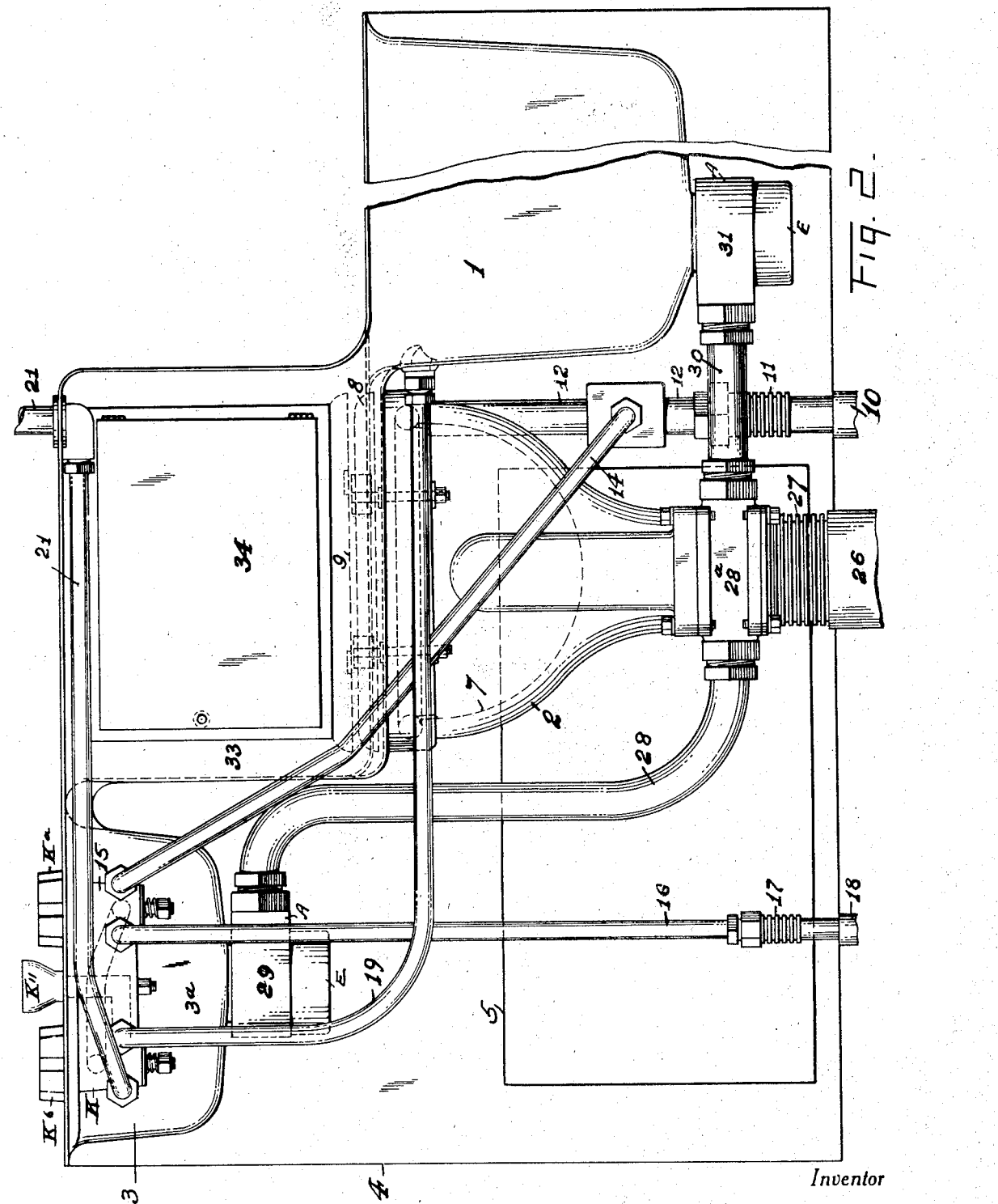
Figure 2 is a rear elevation of the structure shown in Figure 1.

Referring now to the reference characters placed upon the drawings:

The numeral 1, indicates the bath tub, 2 the toilet, and 3 the lavatory of the unitary structure. The several parts are preferably formed of sheet metal of unitary construction with the exception of the toilet which may be of usual porcelain type, but joined to the other parts to provide a unitary collocated construction.

It will be understood that the several fixtures shown in Figure 1 may be arranged for installation against a side and either of the end walls of a room,—in other words it is contemplated that the bathroom equipment may be either right or left hand construction to adapt it for different installations.

The closure wall 4 of the lavatory extends to the floor of the front and side thereof and also in front of the bath tub to the floor to conceal the piping connecting the several fixtures.

The numeral 5 indicates a panel in the front wall of the structure by removing which access may be had to the piping connecting the several fixtures, traps or other parts for examination and repairs.

The closure wall is indented at 6 in front of the toilet and lavatory to provide foot space that one may stand close to the front of the structure. The space at the rear of the wall and beneath the lavatory bowl, provides a comparatively large compartment to accommodate all necessary plumbing connections between the respective fixtures.

The plumbing connections are installed to provide a unitary construction at the factory before being taken to the place of installation.

The toilet fixture comprises a bowl 7 preferably formed of usual porcelain construction fitted with an annular seat 8, and also a hinged saddle seat 9 facing the tub 1, whereby a foot bath may be taken in the tub when seated to face the latter.

The numeral 10 denotes the cold main water inlet of the building connected by a flexible nipple 11,—hereafter more particularly described,— with the flush pipe 12 leading to the toilet, under control of a suitable flushing valve 13.

The numeral 14 denotes a cold water pipe leading from the pipe 12 to the temperature and selector valve 15, controlling the admission of water to the bowl 3ª of the lavatory.

A hot water pipe 16 is connected by a flexible nipple 17 with the hot water service pipe 18 of the building. The pipe 16 is also connected with the selector valve 15.

The bath tub 1 is connected by a pipe 19 with the selector valve. The numeral 20 denotes a shower outlet connected through pipe 21 with the selector valve 15. Additional shut-off valves, not shown, may be installed in the pipes leading to the shower and tub for greater convenience in controlling the passage of water through the shower or into the tub.

The numeral 22 denotes a rod for supporting a shower curtain,—not shown,—provided with a suitable fitting 23 at one end that it may be secured to the wall of the room,—the other end being supported in a fitting 24, carried by the pipe 21, through which the water passes to the shower outlet.

A flanged collar 25 integral with the fitting 24 provides means for securing the pipe to the wall of the room.

A soil pipe 26 forming part of the general plumbing installation of the building is connected by a flexible pipe nipple 27 of a bellows-like construction, bolted to a fitting 28ª to which the toilet bowl is also secured and through which the contents of the toilet bowl pass to the soil pipe 26.

A pipe 28 connects the fitting 28ª with the trap 29 beneath the lavatory through which the water of the lavatory passes to the soil pipe.

The numeral 30 denotes a pipe connecting a trap 31 beneath the bath tub with the fitting 28ª. A cupboard 32,—see Figure 3,—is located back of the wall 33 rising above the toilet seat, a suitable door 34 provides means for gaining access to the cupboard which may be used for storing linen, bath towels or other supplies.

The traps designated at 29 and 31 respectively located beneath the lavatory and tub are similar in construction and clearly shown in Figure 8 of the drawings;—in which A denotes a chamber supported beneath the fixture by a thimble B screwed into the wall of the chamber, provided with a flange $B^1$ overlapping the wall of the fixture C;—suitable gaskets D D being provided to insure a water tight joint.

The thimble B has a spider frame $B^2$,—see Figure 1,—for the passage of water from the lavatory into a cup E, having a screw-threaded connection with the chamber A. The wall of the thimble above the apertured partition or spider $B^2$ is polygonal,—see F,—on its inner face, to receive a correspondingly faced wrench, whereby the thimble may be removed when required.

The detachable cup E screwed into the wall of the chamber A and projecting below the end of the thimble B, is also polygonal in form at G, whereby the cup may be readily removed from the chamber A for inspection or cleaning, upon the application of a suitable wrench.

The flexible pipes or nipples 11, 17 and 27 are constructed of corrugated sheet metal as indicated in Figure 9 of the drawings and at each end are provided with suitable flanges $21^1$ whereby they may be bolted to the connecting pipe fitting.

As previously indicated, by the use of a flexible pipe of this character, any lateral variation between the spacing of the respective service pipes of the building and the corresponding pipes of the unitary structure may be made to accommodate each other through the use of these flexible connections, and furthermore the annoying pounding in the service pipes due to a sudden closing of the controlling valves is thus overcome.

The combined temperature and selector valves,—shown in detail in Figures 4 to 7 inclusive, are installed upon the lavatory to control the flow of water delivered to the lavatory, bath tub and shower and it consists of a divided chambered casting K, provided with tapped inlets $K^1$, $K^2$, respectively for cold and hot water, and $K^3$, $K^4$, respectively for delivery to the tub and shower, also a passage $K^5$ leading from the temperature or mixing valve $K^a$ to the selector valve $K^6$ and from the selector valve through the passage $K^7$ and discharge outlet $K^8$ into the bowl.

$K^9$ is a septum integral with the wall of the casting and projecting into the discharge channel $K^8$ to provide a narrow port $K^{10}$ opening into a fountain-cup $K^{11}$, by means of which upon covering the end of the discharge spout $K^8$, water will flow up into the cup $K^{11}$ for drinking purposes.

A bolt $K^{12}$ extends upwardly through the casting to secure the upper and lower member of the casting in gripping engagement with the sheet metal wall of the lavatory. The head $K^{13}$ of the bolt overlaps a boss $K^{14}$ rising from the septum $K^9$, to force the water towards the sides of the cup upon entering the latter.

Having indicated the several parts by reference characters, the construction and operation of the device will be readily understood.

It will now be apparent that the workman has only three connections to make, to couple the pipes of the unitary structure with the corresponding service pipes of the building, and if the latter do not register exactly with those of the device, the flexible pipe-nipples 11, 17 and 27 will readily adapt themselves to any lateral adjustment necessary.

Having connected the respective hot, cold water, and soil pipes with the corresponding pipes of the building, the installation is completed and ready for use.

Hot, cold or warm water,—tempered through the mixture of hot and cold water,—may be directed to the lavatory, tub or shower outlets upon first adjusting the valve K to admit either the hot or cold water,—or both as required,—to the combination valve fitting 15, whereupon the selector valve $K^6$ is then adjusted to direct the stream to the lavatory, tub, or shower as required.

The flow of water may be entirely cut off by adjusting the valve $K^6$, or the water may be cut off from entering the combination valve fitting, by adjusting the valve $K^a$. As previously indicated, cold water may be directed to the bowl and upon holding the hand over the discharge outlet $K^8$, the water will pass upwardly through the port $K^{10}$, into the fountain drinking cup $K^{11}$.

To examine and clean the traps 29, 31, the cup is unscrewed from the bottom of the chamber A, whereupon the deposit may be removed and the cup replaced.

Having thus described my invention, what I claim is:

1. A unitary plumbing bathroom equipment, including tub and shower baths, and lavatory; hot and cold water pipes connected therewith and adapted for connection with the corresponding service pipes of a building; a mixing and selector valve connected with the hot and cold water pipes for controlling the admission of either hot or cold water or both to said valve chamber and to direct same therefrom respectively to the bath tub, shower bath and lavatory, said mixing and selector valve comprising also a fountain drinking cup including a by-pass for water from the discharge outlet of the valve into the cup, whereby upon covering the discharge outlet with the hand, water will be directed into the fountain drinking cup, the overflow of the cup passing into the bowl of the lavatory until the hand is withdrawn.

2. A unitary plumbing bathroom equipment including a tub, shower bath, and lavatory; hot and cold water pipes connected therewith and adapted for connection with the corresponding service pipes of a building; a mixing and selector valve connected with the hot and cold water pipes for controlling the admission of either hot or cold water or both into the body of the valve and for directing the same to the bath tub, shower or lavatory; said mixing and selector valves embodying a divided valve chamber, a fountain drinking cup including a by-pass for water from the discharge outlet of the valve into the cup; a bolt adapted to connect the divided parts of the valve chamber together as a unit, the head of the bolt overlapping the wall of the by-pass to force the water passing therethrough against the wall of the drinking cup.

3. A unitary plumbing bathroom equipment including a toilet, tub, shower bath and lavatory; a soil pipe adapted to connect the toilet with the soil pipe of a building; drain pipes connecting the tub, shower bath and lavatory, with the soil pipe; traps for the bath and lavatory comprising a chamber adapted for connection with the drain pipes, comprising a depending thimble screwed into the wall of the chamber, having a flange overlapping the wall of the bath and lavatory, said thimble having also a transverse partition grating; gaskets interposed between the flange and wall of the fixture; said thimble having an inner polygonal-shaped wall above the partition grating, to facilitate its removal upon application of a suitable wrench; a detachable cup screwed to the wall of the chamber and projecting below the open end of the thimble, whereby upon removal of the cup the trap may be cleaned; and a closure wall extending from the upper level of the respective fittings to the floor, adapted to conceal the service pipes and traps.

RALPH B. OTWELL.